United States Patent [19]

Fortune

[45] Date of Patent: Feb. 5, 1985

[54] TIP ASSEMBLY HAVING REPLACEABLE TIP

[76] Inventor: William S. Fortune, 29866 Cuthbert St., Malibu, Calif. 90265

[21] Appl. No.: 350,698

[22] Filed: Feb. 22, 1982

[51] Int. Cl.³ .................................. B23K 3/00
[52] U.S. Cl. ........................................ 228/20; 228/264
[58] Field of Search .................... 228/19, 20, 264; 15/339, 341, 344, 414, 415 R

[56] References Cited

U.S. PATENT DOCUMENTS

| 3,862,468 | 1/1975 | Fortune | 228/20 X |
| 4,056,334 | 11/1977 | Fortune | 228/20 X |
| 4,204,299 | 5/1980 | Fortune | 228/20 X |

FOREIGN PATENT DOCUMENTS

| 693197 | 6/1953 | United Kingdom | 228/20 |
| 2004798A | 4/1979 | United Kingdom | 228/20 |

*Primary Examiner*—Kuang Y. Lin
*Attorney, Agent, or Firm*—Daniel T. Anderson

[57] ABSTRACT

A tip assembly for a desoldering instrument, which features a replacable tip. The tip assembly itself includes a tip housing which houses the replaceable tip and a spacer bushing. Screwed into the tip housing is an end cap against which the spacer bushing bears. The replaceable tip preferably consists of Teflon; that is, polytetrafluoroethylene resin. The Teflon may be substantially pure Teflon which has the advantage that it releases solder readily, or it may consist of a conductive Teflon, filled or mixed, for example, with carbon, which makes it conductive and provides an anti-static feature. The tip housing extends very closely to the outer end of the tip, to provide a heat sink and to provide electrical conduction. Alternatively, the tip may be relatively long and extend substantially through the bore of the tip housing. It is surrounded by a spacer bushing of pure Teflon. When the tip wears down substantially to the tip housing, it may be removed and a portion of the spacer bushing may be severed and put behind the replaceable tip, thereby to extend the tip again through the housing. This procedure may be repeated until all of the spacer bushing is behind the tip. Both the tip housing and the end cap may form a single unit, and preferably consist of aluminum, to provide a lightweight tip assembly which is conductive for both heat and electricity.

15 Claims, 6 Drawing Figures

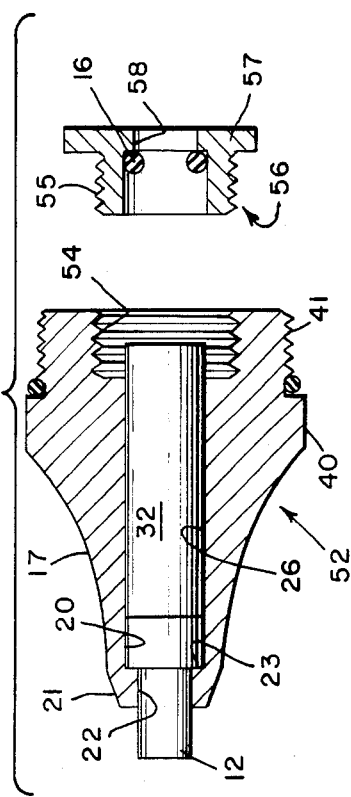
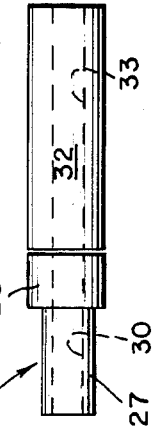
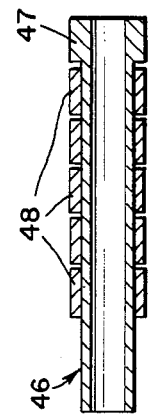
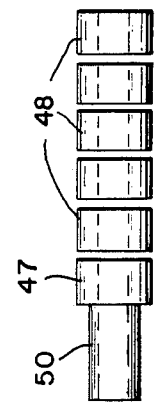
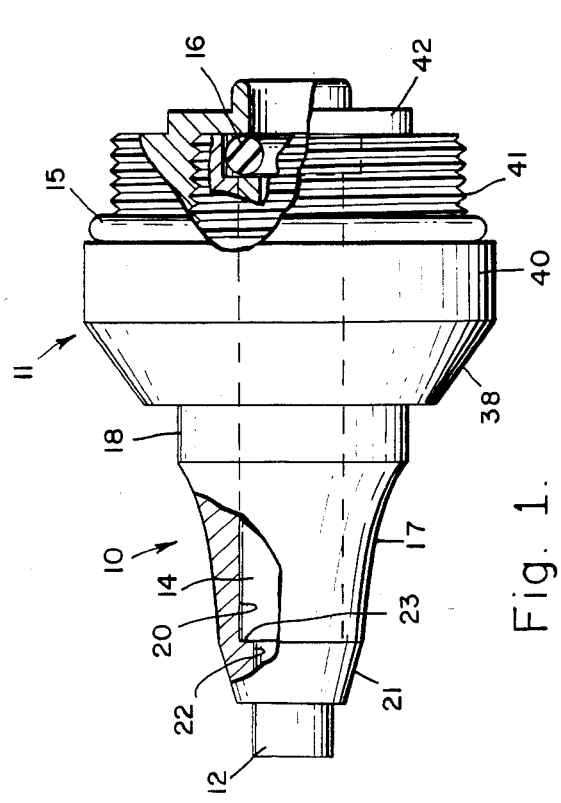
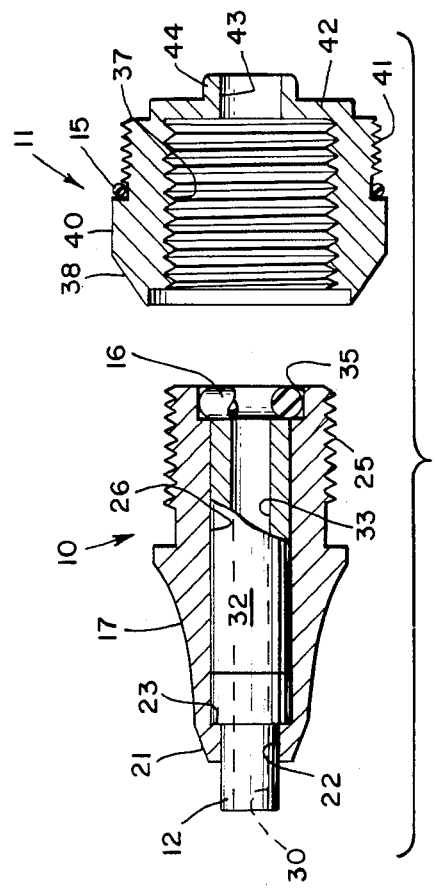

TIP ASSEMBLY HAVING REPLACEABLE TIP

BACKGROUND OF THE INVENTION

The present invention relates generally to tip assemblies for desoldering instruments, and particularly relates to such an assembly having a readily replaceable tip.

Generally the tip of the tip assembly of a desoldering instrument is made of Teflon, because it is highly heat resistant and also resists the chemical action of hot solder. Substantially pure Teflon has the advantage that it will readily release hot solder. On the other hand, Teflon is substantially an insulator, and hence as such is incapable of dissipating static charges which may exist on a circuit board or integrated circuit chip which is to be desoldered.

Accordingly, it is desirable to provide a tip assembly which can be made of pure Teflon with its attractive properties and to dissipate static charges by the construction of the tip housing.

In accordance with the present invention, this is achieved by providing a tip housing which closely surrounds the replacable tip. Furthermore, the tip need only extend for a very short distance from the housing, thus facilitating discharge of electrical charges.

However, if even better anti-static properties are required, the relatively short tip can be made of a conductive Teflon composition which may, for example, include carbon.

The present invention may be considered to be an improvement of the applicant's prior application, "Replaceable Tip Assembly for Desoldering Tools," filed on July 7, 1978, Ser. No. 922,676, now U.S. Pat. No. 4,204,299. However, the tip assembly of the present invention is a higher quality product.

SUMMARY OF THE DISCLOSURE

A tip assembly in accordance with the present invention includes basically a tip housing, an end cap, a tip, a spacer bushing and one or two O-rings.

Both the tip housing and the end cap may consist of metal, and preferably aluminum, to provide a lightweight housing which is electrically conductive and cam provide a heat sink. The tip housing has an external screw thread at its rear end. The outward forward portion of the tip housing has a decreasing diameter forming a convex curve toward the front. The extreme outward portion forms a short cone, while a central cylindrical bore extends along the central axis of the housing. The front portion of this cylindrical bore is of smaller diameter than that of the remainder of the bore. This in turn creates a shoulder for a tip which has a disk-like rear portion to bear against the shoulder.

The end cap has a central wide bore provided with an internal screw thread which matches the external screw thread of the housing. The rear portion of the bore is of smaller diameter and forms a disk extending beyond the rear surface of the end cap. End cap and tip housing may form a single unit.

Finally, a spacer bushing, preferably of substantially pure Teflon, extends through the bore of said tip housing and is pressed longitudinally between the end cap disk and the rear surface of the tip to hold it fully forwardly.

The novel features that are considered characteristic of this invention are set forth with particularity in the appended claims. The invention itself, however, both as to its organization and method of operation, as well as additional objects and advantages thereof, will best be understood from the following description, when read in connection with the accompanying drawings.

BRIEF DESCRIPTION OF THE DRAWINGS

FIG. 1 is an elevational view of a tip assembly in accordance with the present invention, portions being broken away to show some of the details of construction;

FIG. 2 is an exploded cross-sectional view of the tip housing and end cap of FIG. 1;

FIG. 3 is an exploded view of the replacable tip and spacer bushing forming the preferred form of the present invention;

FIGS. 4 and 5 are elevational views of another form of the replacable tip, of greater length, and a spacer bushing consisting of several sections, FIG. 4 showing the assembly in its original form and FIG. 5 illustrating the tip which has been worn down so that it will just extend from the housing; and FIG. 6 is an exploded cross-sectional view of another form of the tip assembly of the invention; here the tip housing and end cap are made in a single piece and with a separate short portion of the rear end of the assembly.

DESCRIPTION OF THE PREFERRED EMBODIMENT

Referring now to the drawings, and particularly to FIGS. 1 through 3, there is illustrated a tip assembly embodying the present invention. The tip assembly of FIG. 1 includes a tip housing 10, and end cap 11, a replacable tip 12, a spacer bushing 14, a first O-ring 15, and a second O-ring 16.

Turning now to the tip housing 10, it preferably consists of metal and particularly of aluminum because it is light weight, thermally conductive and electrically conductive. The tip housing 10 has an outward forward portion 17 forming, in cross section, a substantially concave curve. Furthermore, as clearly shown, the forward portion 17 of the tip housing 10 is provided with two opposed flats 18 for engagement with a suitable wrench (which may, for example, be the "Combination Tip Wrench and Stand" disclosed and claimed in the applicant's prior application Ser. No. 310,945, filed Oct. 13, 1981).

The tip housing 10 is provided with a central bore 20 which is coaxial with the central axis thereof. The front portion of the tip housing 10 forms a short cone 21 through which extends a central bore 22 of smaller diameter than that of the bore 20. Hence, a shoulder 23 is formed between the two bores 20 and 22.

As clearly shown in FIG. 2, the rearward portion of the tip housing 10 is provided with a screw thread 25.

Disposed in the tip housing 10 is a desoldering tip 12 which has a forward cylindrical portion 27 and a rearward portion 28 of larger outer diameter to be retained by the shoulder 23, as shown in FIG. 1. The desoldering tip 12 is provided with an internal bore 30, as is the rearward portion 28. A spacer bushing 32, which may be omitted in some cases, has the same outward diameter as the rear portion 28 of the desoldering tip, and is also provided with an inner bore 33.

The tip housing 10 is provided with a recessed portion 35 at its rear, to provide a seat for the O-ring 16, which serves the purpose to cushion the desoldering tip 12 and the spacer bushing 32. This will prevent too severe impacts when the desoldering tool hits the circuit board or an integrated circuit chip being worked on.

The end cap 11 is provided with an internal screw thread 37 to match the external screw thread 25 of the tip housing. The outside of the end cap 11 is provided at its front with a conical portion 38 to provide a smooth continuation of the curve 17 of the tip housing. It is followed by a knurled portion 40 (see FIG. 1) to provide a better grip for the removal of the tip housing 10. The knurled portion 40 is followed by an external screw thread 41 having a somewhat smaller diameter than that of knurled portion 40. It serves the purpose of connecting the tip assembly to the remainder of the desoldering tool. Disposed in the forward portion of the screw thread 41 and adjacent the knurled portion 40 is the other O-ring 15.

The extreme rear of the end cap 11 is provided with a disk-like portion or cap 42 which closes the rear of the end cap, except for a central bore 43. Preferably the disk 42 extends through a small cylinder 44. This will serve the purpose of preventing large pieces of solder from passing through the tip assembly into the desoldering instrument.

By way of example, both the desoldering tip 12 and the spacer bushing 32 preferably consist of a heat resistant plastic material. Preferably the spacer bushing 32 is made of substantially pure Teflon. The desoldering tip 12 may consist of either substantially pure Teflon or conductive Teflon which has been mixed with a conductive material such as carbon.

As explained before, the substantially pure Teflon has the advantageous property that it releases solder readily. The same is not true of the conductive Teflon. On the other hand, conductive Teflon will, of course, conduct static electric charges, and hence acts as an anti-static device to minimize danger to the circuit board or integrated circuit chip. Hence, depending on circumstances and requirements, the desoldering tip 12 may be made either of substantially pure Teflon or of conductive Teflon.

It should be noted that the desoldering tip extends from the tip housing 10 only a short distance, which is on the same order as the length of the cone 21 of the housing 10. This will generally minimize the effects of the static charge, which may simply be absorbed by the tip housing. Furthermore, due to the construction of the tip housing 10 and its close vicinity to the desoldering tip 12, it will act as a heat sink. Because the desoldering tip 12 is rapidly heated by contact with the hot solder, it is important to dissipate the heat of the desoldering tip while it is being used, thereby to minimize wear and tear on the tip.

It will be understood that since the tip 12 is relatively short and hence inexpensive, it can readily be exchanged for a new tip after it has been worn down.

The assembly of the tip assembly will now be evident. At first the tip 12 is loaded into the tip housing 10 from the right-hand side, as shown in FIG. 2. Then the spacer bushing 32 is pushed into the tip housing 10 and followed by the O-ring 16. Thereupon the tip housing 10 and the end cap 11 are joined by screwing together.

Referring now to FIGS. 4 and 5, there is illustrated another form of the desoldering tip and spacer bushing. The desoldering tip 46 of FIG. 4 is relatively long and has an enlarged portion 47 at its rear end which can bear against the cap 42 of the tip housing 10. However, because the total length of the tip 46 is rather long, a spacer bushing 48, which may consist of individual sections, for example five, shown in FIGS. 4 and 5, is interposed between the free end of the tip 46 and its rear end 47. As the tip 46 wears off, one after another of the spacer bushing sections 48 are inserted behind the enlarged portion 47 of the tip, as shown in FIG. 5. Thus, as shown in FIG. 5, the tip 46 is worn off to a short length 50, which substantially equals that of the tip 12 of FIG. 3. In other words, the forward end of the tip 46 can be worn down six times before the tip has to be replaced. Otherwise, the operation of the tip assembly utilizing a tip 46 and spacer bushings 48 is exactly the same as that of the tip and spacer bushing of FIG. 3.

It should be noted that the spacer bushing 32 of FIG. 3 or the long tip 46 of FIG. 4 provides a guide for the piston shaft, which when cocked, extends through the tip assembly.

Another construction of the tip assembly itself is shown in FIG. 6. Here the tip housing 10 and the end cap 11 are made integral with each other, to provide a housing 52 which has substantially the same shape as does that of FIGS. 1 and 2. However, the rear portion of what was the end cap 11 has been made removable. To this end the rear portion of the housing 52 is provided with an internal screw thread 54 matching the external screw thread 55 of the disk-like rear portion 56. The rear portion 56 has a rearward disk 57 and a reduced internal bore 58 of lesser diameter than that of the bore 60 which matches bore 26 of the housing 52. The O-ring 16 is now disposed at the shoulder between the bores 58 and 60.

The housing of FIG. 6 has the advantage that it is easier to machine, requires less labor, and hence is more inexpensive.

It is also feasible to replace the O-ring 16 of FIGS. 1 and 2 with an O-ring which is provided with a flappy internally extending portion to provide a one-way valve. Thus, when the piston shaft of the desoldering instrument is cocked, the shaft moves toward and through the tip assembly of the invention. When the shaft passes through the seal depending from the O-ring 16, the seal will allow air to pass freely therethrough. This is because when the seal flexes, the walls flex away from the shaft.

However, when the piston shaft moves backwards to create a vacuum, the sealing edges are pulled toward the central line closing the seal. Hence, this type of seal acts as a check valve.

Instead of securing the short tip 12 of FIGS. 1 and 3 by a spacer bushing 32, a simpler construction is also possible. In this case, the short tip 12 may be made of uniform diameter and provided with an external screw thread matching an internal screw thread in the bore 20 or 22 of the tip housing. The tiplet 12 may thus be inserted from the front or rear; only the forward portion of the bore in the tip housing need be provided with a screw thread. It will be understood that in this case the spacer bushing 32 may be omitted.

If the modification of FIG. 6 is used, the separate end cap or disk 56 may be molded of a suitable plastic integral with the spacer bushing 32 to simplify construction. The same small short tip 12 may be used with this modification.

There has thus been disclosed a tip assembly which is so arranged that a short tip may be used which may either be formed of substantially pure Teflon or of conductive Teflon, depending on the desired end use. An aluminum tip housing acts as a heat sink to conduct away the heat which the tip acquires during use. The short tip is backed by a somewhat elongated spacer bushing. Alternatively, the tip may be made in the form of a long desoldering tip. When it wears out, sections of a spacer bushing may be put behind the enlarged rear portion of the tip so that it can be used for an extended period of time. The tip housing and end cap may be made in one piece to facilitate machining thereof. In that case, the rear portion of the end cap may be screwed into the remainder of the housing, thereby to make possible introduction of the longer desoldering tip or the short tip and spacer bushing.

What is claimed is:

1. A tip assembly for a desoldering instrument, the assembly having a replaceable tip, said assembly comprising:
   (a) a tip housing portion and having an outward forward portion with a decreasing diameter forming in cross-section a concave curve, the extreme outward front portion forming a short cone, and a central cylindrical bore extending along the central axis of said housing portion, the front portion of said cylindrical bore being of smaller diameter than that of the remainder of said cylindrical bore;
   (b) an end cap portion threaded to the rear portion of the tip housing portion and having a central wide bore, the rear end of said bore being of smaller diameter and forming a disk extending beyond the rear surface of said end cap portion; and
   (c) a desoldering tip retained by and forwardly of said disk having an internal bore and extending through said bore of said tip housing and formed of a heat-resistant plastic material, said short cone of said housing forming a heat sink for said tip wherein said housing portion and said end cap portion are separate pieces removably secured together by screw threads provided on each one of said portions and a spacer bushing of substantially pure Teflon extending through said bore of said tip housing portion to the rear end thereof and in contact with said tip.

2. An assembly as defined in claim 1 wherein the tip is so short as to extend only through said front portion of said bore and extending beyond said housing, said tip having a rear end formed in the shape of a disk, and said bushing bearing against said disk of said tip and said disk of said end cap, whereby said short tip is readily replaceable.

3. An assembly as defined in claim 2 wherein the length of said tip extending from said housing portion is approximately the same order as the length of said short cone on said housing portion.

4. An assembly as defined in claim 3 wherein said tip is of substantially pure Teflon.

5. An assembly as defined in claim 3 wherein said tip is of conductive Teflon.

6. An assembly as defined in claim 1 wherein said tip housing is provided on its outside at its rear end with two opposed flat portions to facilitate removal thereof by a wrench.

7. An assembly as defined in claim 1 wherein said end cap is provided with an external screw thread for connecting it to a desoldering instrument.

8. An assembly as defined in claim 7 wherein a first O-ring is disposed at the front end of said external screw thread of said end cap.

9. An assembly as defined in claim 8 wherein a second O-ring is disposed at the rear end of said bushing to cushion the impact of said tip assembly on a circuit board or the like.

10. An assembly as defined in claim 1 wherein said disk of said end cap is of substantial thickness to form a solder shield and to substantially prevent large pieces of solder from moving past the end cap.

11. A tip assembly as defined in claim 1 wherein said tip housing and said end cap consist of aluminum for better heat and electrical conduction.

12. A tip assembly as defined in claim 1 wherein said end cap has a forward outer end portion of substantially conical shape to continue smoothly the outer surface of said tip housing, said forward outer end portion of said end cap being followed by a knurled portion to facilitate removal of said housing from said end cap.

13. A tip assembly for a desoldering instrument the assembly having a replaceable tip, said assembly comprising:
   (a) a tip housing portion and having an outward forward portion with a decreasing diameter forming in cross section a concave curve, the extreme outward front portion forming a short cone, and a central cylindrical bore extending along the central axis of said housing portion, the front portion of said cylindrical bore being of smaller diameter than that of the remainder of said cylindrical bore;
   (b) an end cap portion threaded to the rear portion of the tip housing portion and having a central wide bore, the rear end of said bore being of smaller diameter and forming a disk extending beyond the rear surface of said end cap portion; and
   (c) a desoldering tip retained by and forwardly of said disk having an internal bore and extending through said bore of said tip housing and formed of a heat resistant plastic material, said short cone of said housing forming a heat sink for said tip, wherein said tip is sufficiently long to bear against said disk of said end cap and extends beyond said tip housing, a bushing normally surrounding said tip and bearing against said disk of said end cap whereby after wear of said tip toward said tip housing, a portion of said bushing may be severed and put behind said disk of said tip, thereby to extend the tip beyond said housing.

14. An assembly as defined in claim 7 wherein said tip consists of substantially pure Teflon.

15. An assembly as defined in claim 7 wherein said tip consists of conductive Teflon.

* * * * *